Figure 1:
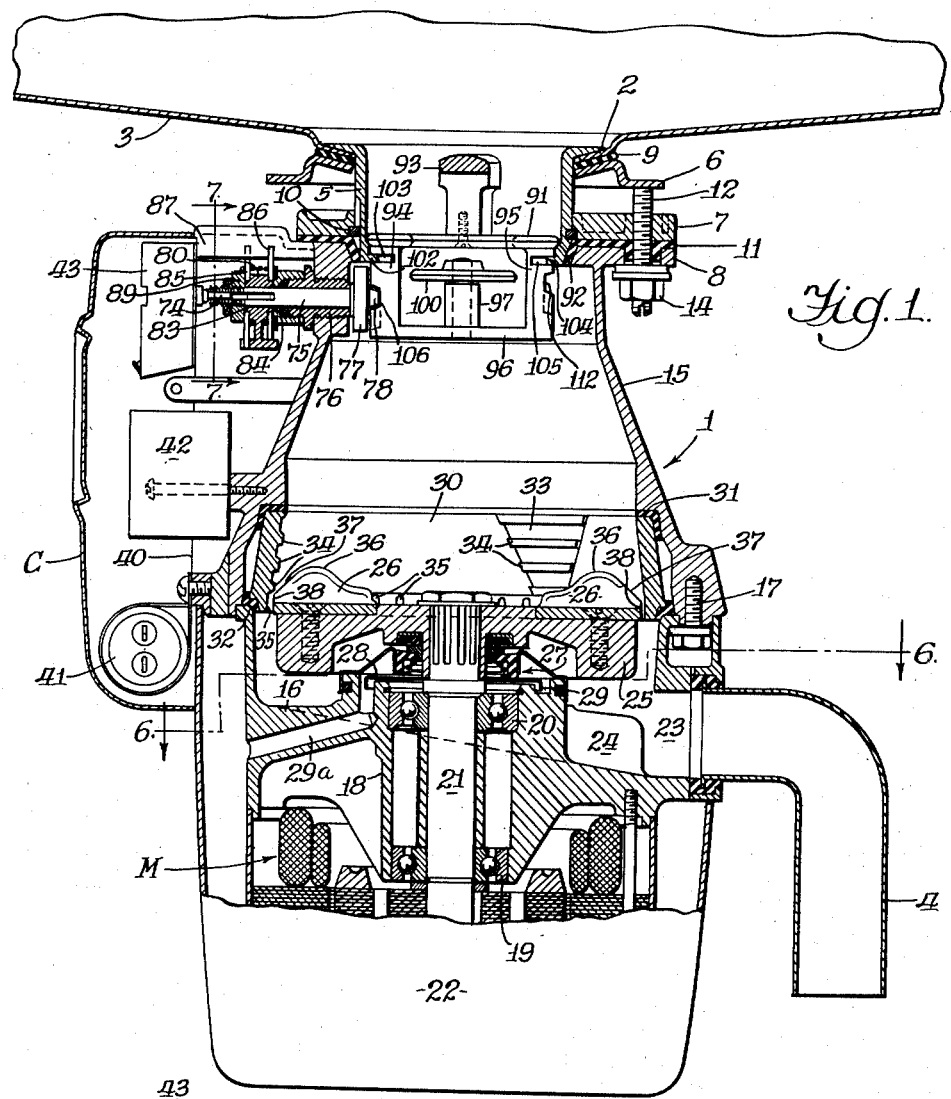

Feb. 16, 1954    T. H. SWISHER    2,669,395
KITCHEN WASTE DISPOSAL APPARATUS WITH REVERSING MEANS
Filed May 31, 1951    3 Sheets-Sheet 1

INVENTOR.
Thomas H. Swisher
BY
Andrew G. Hubbard
Atty.

Feb. 16, 1954     T. H. SWISHER     2,669,395
KITCHEN WASTE DISPOSAL APPARATUS WITH REVERSING MEANS
Filed May 31, 1951     3 Sheets-Sheet 2
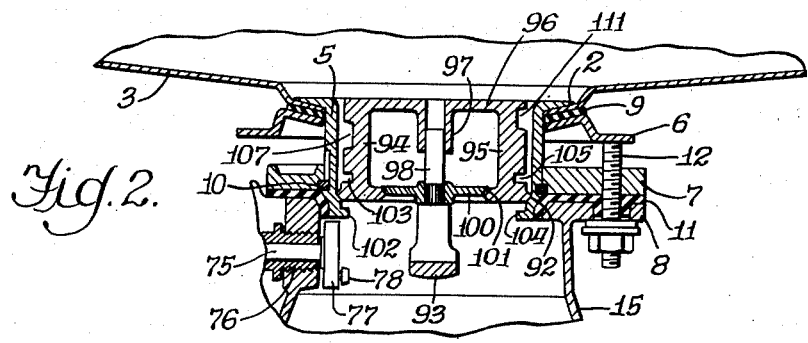
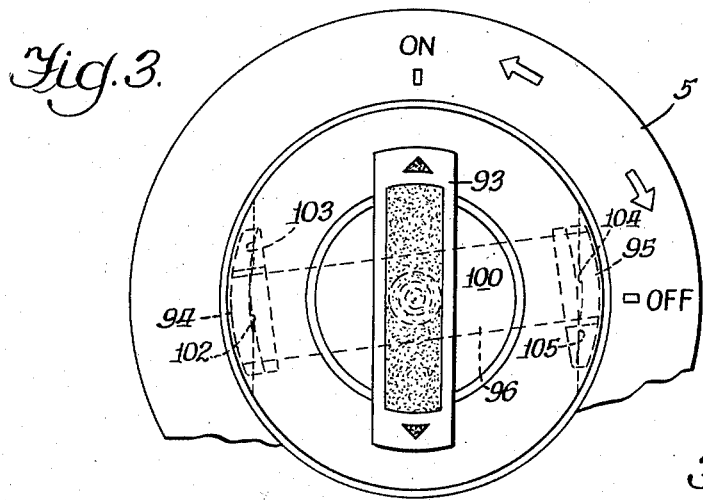
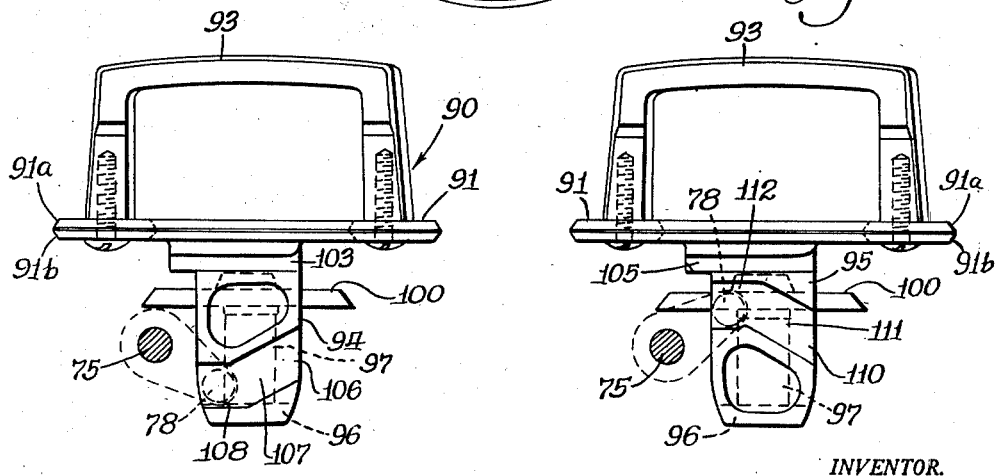
INVENTOR.
Thomas H. Swisher Feb. 16, 1954     T. H. SWISHER     2,669,395
KITCHEN WASTE DISPOSAL APPARATUS WITH REVERSING MEANS
Filed May 31, 1951     3 Sheets-Sheet 3
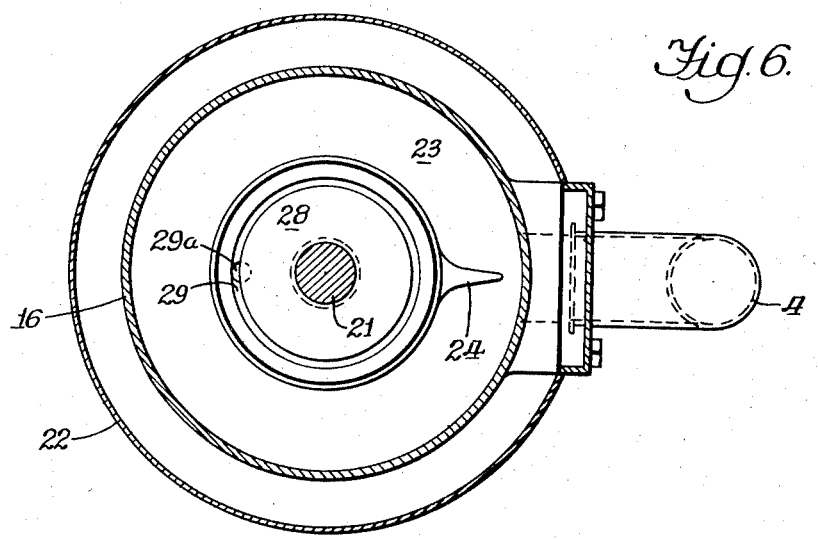
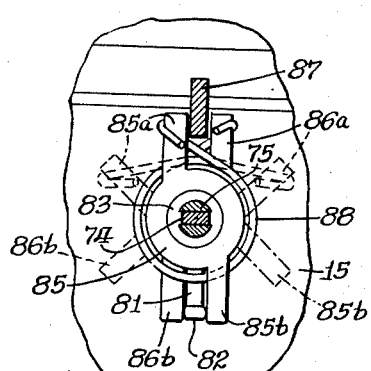
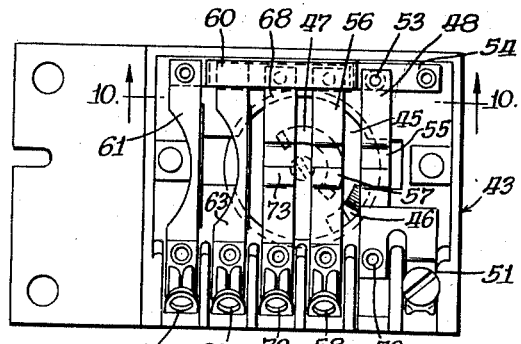
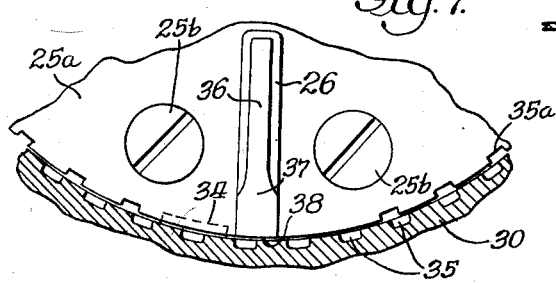
INVENTOR.
Thomas H. Swisher Patented Feb. 16, 1954

2,669,395

UNITED STATES PATENT OFFICE 2,669,395

KITCHEN WASTE DISPOSAL APPARATUS WITH REVERSING MEANS

Thomas H. Swisher, Elmhurst, Ill., assignor to General Electric Company, a corporation of New York Application May 31, 1951, Serial No. 229,215

9 Claims. (Cl. 241—63)

This invention relates to kitchen waste disposal machines, and particularly to an improved control mechanism for the drive motor thereof.

Kitchen waste disposal devices, by means of which garbage and waste food materials are ground to small particle size in the presence of water and passed into the plumbing waste line, are becoming increasingly popular; in fact, municipal authorities have recognized them as a practical solution of the waste disposal problem. As is now well known, garbage disposal devices have a comminution chamber or hopper mounted beneath the basin of a kitchen sink and have a throat or inlet passage communicating with the sink drain opening. Motor driven comminution devices are located at the base of the chamber. The usual sink drain stopper is replaced by an inlet fitting which, in the present invention, has a novel structure for operating a switch in the motor circuit. In use the housewife removes the fitting and loads the kitchen waste into the hopper, then places the inlet fitting in motor-operating position and turns on the cold water faucet so that a suitable volume of water flows from the sink into the hopper. The mechanism then operates to reduce the waste to small particle size and discharge it through a tail piece into the drain line, whence it flows to the sewer, septic tank, or the like.

It has been found that the users of garbage disposal machines will overload them; place unduly long bones or corn cobs into the hopper; and accidentally or otherwise permit cloth or metallic articles to enter the hopper. Such careless usage may result in jamming the flywheel and stalling the motor, making it necessary promptly to break the jam before damage occurs. It is also the experience of manufacturers of these machines that the user expects them to operate quickly, and as a result may not leave the machine in operation for the necessary time; and if the comminuting mechanism becomes dulled or worn so that its action is slowed, enough material may remain in the chamber to block the drain passages and retard normal drainage from the sink when the sink is being used for ordinary purposes.

It is therefore a principal object of the invention to provide a kitchen waste disposal device having an improved control means by which the direction of rotation of the comminution mechanism may be reversed, thus providing means which in the usual jamming condition will dislodge the offending material and restore the operation of the machine, and which by distributing the wear in the comminution mechanism will materially lengthen the effective life thereof.

It is another object of the invention to provide a kitchen waste disposal machine having fixed cutting, shredding and abrading devices against which said materials are thrown by impeller devices on a motor driven flywheel, said machine operating with equal effectiveness for either direction of rotation of the flywheel and thereby making more efficient use of the said comminuting devices to prolong the life thereof.

It is another object of the invention to provide an improved motor reversing switch actuator for a kitchen waste disposal machine.

It is a still further object of the invention to provide a simplified inlet fitting which may optionally be used as a sink stopper or as the control switch actuator of a waste disposal machine; and in the latter function operate the drive motor in one or the other direction according to the placement of the fitting in the machine.

It is yet another object of the invention to provide an inlet fitting for a kitchen waste disposal apparatus which will insure an adequate flow of water thereinto while serving as an effective guard against the introduction of silverware, bottle caps, and other extraneous objects.

It is a further object of the invention to provide a combination inlet fitting and motor reversing switch actuator for a kitchen waste disposal machine of the reversing rotor type.

It is another object of the invention to provide, for a kitchen waste disposal machine, an inlet fitting through which water will flow into the hopper in a pattern which reduces the transmission of noise from within the hopper.

Figure 11:
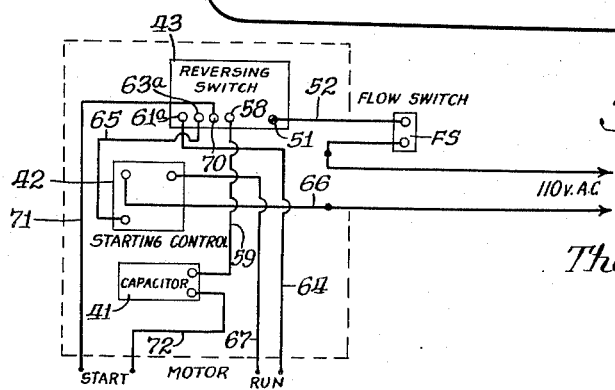

The manner of accomplishing these and other objectives will best be understood from the following detailed description of a presently preferred embodiment thereof, taken in conjunction with the accompanying drawings in which: Fig. 1 is a vertical elevation, partially in section, of a kitchen waste disposer embodying my invention; Fig. 2 is a vertical sectional elevation of the inlet portion of the machine with the inlet fitting used as a stopper to close the inlet against drainage of water from the sink basin; Fig. 3 is a partial plan view of the inlet fitting when in its waste disposal operation position; Figs. 4 and 5 are side elevational views of the inlet fitting, in which Fig. 4 indicates the cooperation of the motor switch actuator and inlet cam to establish one direction of rotation and Fig. 5 shows the fitting rotated through 180 degrees to indicate the operation of the other motor switch actuator cam to effect the opposite direction of motor operation; Fig. 6 is a plan section taken on lines 6—6 of Fig. 1; Fig. 7 is a fragmentary plan detail of a flywheel impeller and indicating the relationship of the impeller to the overlying shredder pad; Fig. 8 is an elevational detail of the motor switch return mechanism; Fig. 9 is a front elevation of the reversing switch with the casing removed; Fig. 10 is a partial sectional elevation of the reversing switch taken on lines 10—10 of Fig. 9; and Fig. 11 is a typical circuit diagram.

General Description

In Fig. 1 a waste disposal machine 1 is affixed to the drain opening 2 of a kitchen sink 3 and has a tail piece 4 intended to be connected to the waste line (not shown) of the building plumbing system, as is now well understood. The machine is suspended, so to speak, from the sink by means of a collar 5, a clamping ring 6, and a support ring 7 to which is secured the upper flanged portion 8 of the upper body portion of the machine. The illustrated support mechanism is but a variant of conventional devices used in similar situations. Suffice it to say that after the collar 5 is placed within the sink drainage opening, the gasket 9, clamping ring 6, and support ring 7 are placed thereover and a snap ring 10 is seated in a groove provided in the collar. Then the gasket or packing 11 is placed on the flange 8 and the flange secured to the support ring 7 by a suitable plurality of screws 12 and lock nuts 14. It will be apparent that as the screw members are made up, the respective elements become integrated into a leak-proof support system by which the machine is held to the sink.

The upper machine portion 15 comprises a hopper which is suitably attached to a main housing 16, as by a suitable number of screws 17. The housing has a large hub 18 carrying an upper bearing 20 and a lower bearing 19 for the shaft 21 of a suitable motor M of which the stator is secured to a lower marginal portion of the main housing. The motor and housing are concealed by a removable cover 22, around the bottom periphery of which are a plurality of drainage openings (not shown). Housing 16 provides a drainage chamber 23 to the outlet of which is attached the tail piece 4. A vane 24 adapts the drainage chamber for forward or reverse operation of the comminution means as presently explained. Splined to shaft 21 is a relatively heavy flywheel 25. I prefer to face the flywheel with an annular plate 25a fastened thereto by suitably staked screws 25b (Fig. 7). Preferably, the facing plate is of wear and corrosion resistant material, such as aluminum bronze, and is provided with the diametrically opposed impellers 26 which may be integral therewith. I provide a conventional rotating shaft seal assembly 27 to guard against water leakage along the motor shaft, and also prefer to utilize a conventional "water slinger" plate 28 fixed to shaft 21 and having a depending flange which rides within a drainage groove 29 communicating with a discharge passage 29a. Any small amount of water which may leak past the shaft seal when the unit is in operation will be caught by the water slinger and thrown into groove 29, from which it will be carried away from the motor by passage 29a, and escape through the drainage openings.

The hopper 15 is substantially frusto-conical and carries in its lower portion a shredder ring 30 which, as later described, provides the primary and secondary shredding action for shredding, cutting and abrading the materials to be disposed. Specifically, ring 30 is of a wear-resistant material and seats between a shoulder 31 about the hopper and a shoulder 32 of the main housing; resilient gasket like material is interposed between the ring and the respective shoulders to guard against leakage and to cushion the shredder ring against shock, as is now well known in the art. The shredder ring is provided with a plurality of shredder pads 33 having horizontally arranged cutting ridges 34 which project outwardly from the face of the ring. Three such pads equiangularly spaced about the ring function satisfactorily. It is preferable to form the pads as an integral part of the ring, although they may be detachable therefrom so long as adequate securement devices are provided. Finally, the lower rim of the shredder ring has a row of rather closely spaced openings 35 having relatively sharp forward edges; the shredder pads constitute the primary comminuting members and the sharp edges of the openings 35 form secondary members. The impellers 26 have a dome-like formation 36, the side edges of which are rounded. The forward portions of 37 of the impellers have sharp side edges and the faces 38 are also formed with sharp side edge portions. It will be noted in Fig. 1 that the faces 38 sweep in front of the apertures 35 with small clearance and also that the forward portions 37 ride beneath the lowermost cutting ridges 34 in rather close spaced relation.

The motor control circuit

As previously noted, I use a reversible motor, preferably of the capacitor type, and having the usual "start" and "run" windings controlled by a conventional current demand type starting control device. Accordingly, I mount on a wall or boss 40 formed on hopper 15 a capacitor 41, start-run control 42, and reversing switch 43. These electrical components and necessary connecting wiring are enclosed by a removable cover C. In addition, I recommend using a water flow responsive switch FS which is installed in the cold water service line (not shown) of the sink. Said flow switch is in series with the main power circuit as indicated in Fig. 11. For a complete description of a suitable water flow switch and its use in waste disposal apparatus, see Powers U. S. Patent 2,244,402, granted June 3, 1941, for "Waste Disposal Apparatus."

Reversing switch 43 is a standard commercial product utilizing the necessary plurality of spring contact leaves and a rotatable cam for operating the same. As shown in Figs. 9 and 10, switch 43 has an insulated housing 44 within a wall of which is rotatably seated a circular cam 45 having a short rise 46 at its outer rim and a rise 47 comprehending a little less than 180 degrees, at its inner portion. These cam rises cooperate with the several spring contact leaves of the switch as follows: spring leaf 48 is riveted at 50 to the switch base and has an offset bus 51 to which is connected an electrical lead 52 to one pole of the single pole flow switch FS. Its free end has a contact 53 for cooperation with a contact on a bus 54. A V-shaped depression 55 extending toward the cam 45 forms a cam follower; it will be understood that the remainder of the spring leaf 48 lies above the rise 46 so as to permit the same to rotate beneath the leaf without engaging other than the cam follower portion of the spring. Spring leaf 48 is biased to closed contact position against bus 54 and will therefore not rise to open-circuit position until the rise 46 has engaged the follower portion 55 and lifted the same. Spring leaf 56 has a follower portion 57 and a connection terminal 58 to which is attached the lead 59 to one terminal of capacitor 41. The free end of leaf 56 has upper and lower contact points. The upper contact engages with an offset portion 60 of bus 54, which as shown in Fig. 10 eventually drops to make permanent contact with a conductor strap 61. The lower contact engages with a bus 62 disposed beneath said offset portion and connected to a conductor strap 63. Said straps have the respective connection terminals 61a and 63a. Conductor 61 feeds conductor 64 of the "run" motor circuit and conductor 63 feeds conductor 65 leading to the starting control 42 to which also are connected the main power conductor 66 and a conductor 67 completing the motor "run" circuit. Spring leaf 68 has a terminal 70 for connection to conductor 71 serving the "start" winding of the motor; the start-wind circuit is completed through conductor 72 from the other terminal of capacitor 41. A V-shaped follower portion 73 of spring leaf 68 cooperates with cam rise 47 to move its free-end contact points between closed-circuit position against bus 62 or closed-circuit position against the portion 60 of bus 54.

Cam 45 has a short shaft having a flat end portion 74 (Figs. 1 and 8) rotatable forty-five degrees clockwise or counterclockwise from the horizontal or "off" position represented by Fig. 8. Fig. 9 represents one of the "on" positions of switch 43, which is obtained by rotation of cam 45 forty-five degrees clockwise from the "off" position. In said Fig. 9 position, the contact 53 is closed against bus 54, the contact of 56 is closed against bus portion 60 and the contact of 68 is closed against bus 62. In this situation (assuming that cold water is flowing and that the flow switch is closed) a circuit may be traced through from the main power source through switch FS, conductor 52, spring leaf 48, bus 60, leaf 56, conductor 59 to capacitor 41 and start-wind conductor 72; the motor start circuit is completed through condutor 66, start control 42, conductor 65, and conductor 63, bus 62, spring leaf 68, and conductor 71. When the run condition is reached, the run circuit is completed through conductor 61 and conductor 64 and lead 67 from the start control. This circuit establishes one of the run directions. Returning cam 45 counterclockwise of Fig. 9 opens the motor circuit when cam rise 46 engages the V-shaped follower portion 55 of spring leaf 48 and lifts contact 53 away from bus 54. In this position, cam rise 47 will not yet have released the follower portion 57 of leaf 56, nor yet engaged the follower portion 73 of leaf 68, and said leaves 56 and 68 will remain as shown in Fig. 10. If the cam 45 is rotated an additional forty-five degrees counterclockwise, cam rise 47 leaves leaf 56, which closes against bus 62, and engages leaf 68, which rises to close against bus portion 60. The relationship of the respective cam rises 46 and 47 is such that these contacts are closed before cam rise 46 releases spring leaf 48 to restore the motor circuit. The interchange of circuit position of contact leaves 56 and 68 from their Fig. 10 positions produces a circuit rearrangement which causes the motor to operate in reverse direction, as will be readily understood.

Switch actuator

The motor switch cam shaft is operated between its switch-open and two switch-closed positions by the rotation of a shaft 75 journaled in a gland 76 provided in the upper wall portion of the hopper. The outer end of the shaft is bifurcated to fit over the flat portion 74 of said cam shaft. The inner end of shaft 75 carries a crank arm 77 having a roller 78 projecting therefrom. Keyed to shaft 75 to rotate therewith is a collar 80 having a rigid extension 81 terminating in a bar 82 extending parallel to the shaft. Collar 80 has two hubs 83, 84 at its respective ends and on each hub is a switch shaft return member, respectively 85, 86 which returns the cam shaft 74 and actuator shaft 75 to switch open (Fig. 8) position. The respective return members are identical but of opposite hand. Their respective fingers 85a, 86a straddle a fin 87 extending rigidly from the wall of the hopper in the plane of the shaft axis, and fingers 85b, 86b straddle the bar 82. As viewed in Fig. 8, finger 85a is on the left of fin 87 and 85b is on the right of bar 82. The other switch return member is, of course, oppositely arranged. A coil spring 88 is disposed about the collar 80 and its ends are hooked about the fingers 85a, 86a to bias the assembly to the Fig. 8 position, which as stated, represents an open motor circuit. A nut 89 threaded and suitably located on shaft 75 holds the collar 80 and the respective members 85, 86 on said shaft. It will be obvious that rotating the shaft 75 clockwise from the Fig. 8 position will cause bar 82 to drive member 86 clockwise and therefore tighten spring 88, introducing a spring bias urging the shaft 75 to return counterclockwise to open-circuit position. Counterclockwise rotation will from the Fig. 8 position cause member 85 to tension the coil spring in the opposite direction. These clockwise and counterclockwise rotations of the shaft 75 results from a lifting of the roller 78, or a depression of the roller 78, as viewed in Fig. 1. These roller movements result from the manual operation of the inlet fitting as presently described.

The inlet fitting

The inlet fitting 90, see Figs. 4 and 5, comprises an annular plate 91 having the upper and lower edge bevels 91a, 91b, either of which may seat on the beveled shoulder 92 at the base of the collar 5. A handle 93 bridges plate 91 and, see Fig. 1, provides for unobstructed water flow from the sink into the hopper. Two cam legs, respectively 94, 95 extend downwardly from opposite sides of plate 91 and are interconnected by a cross member 96, which forms a second handle. Handle member 96 has a sleeve 97 co-axial with plate 91. A shaft 98 freely slidable in said sleeve, has a valve disk 100 fixed to its end. The valve disk is beveled to seat on the bevel 101 formed on the inner rim of the annular plate 91.

Inlet fitting 90 may be placed within the collar 5 in either of two basic positions—in the disposer operating and normal sink drainage position of Fig. 1, or the sink stopper position of Fig. 2.

When the fitting is to be used as a stopper, it is placed with bevel 91b of plate 91 seating upon bevel 92 of the collar 5; in this position, the valve disc drops by gravity to seat on the beveled seat 101 and effectively stops water flow from the sink bowl into the hopper. The unbroken contact of bevel 91a with the peripheral shoulder 92 adequately seals against leakage of water around the plate 91. It should be noted that no particular care need be taken by the user in placing the inlet fitting in stopper position; that is, the handle member 96 may be in any angular position and need not be parallel with the plane of the drawing shown in Fig. 2.

When the inlet fitting is to be used for operation of the disposal apparatus, it must permit water to flow into the hopper and it must in some fashion operate the switch 43. The first function is accomplished as shown in Fig. 1; when the fitting is placed in collar 5 with the handle 93 uppermost, valve disk 100 drops until arrested by sleeve 97, thus exposing the large central opening of plate 91. Water then may pour over the edge of disk 100 and over the bar 96 into the hopper. It should be remembered that when the disposer is operating, the cold water faucet is open and the discharge therefrom drains from the sink basin into the hopper 15. This inlet fitting position is also used when the waste disposal unit is inoperative and the sink is to drain normally. In this latter instance also, no particular disposition of the fitting in the sleeve is required.

Switch operation is effected through a cam slot formed in the respective cam legs 94, 95 which engages the roller 78. When the fitting is seated and rotated counterclockwise of Fig. 3, a finger 102 projecting from collar 5 enters a slot 103 in leg 94 and a diametrically opposite finger 104 enters a slot 105 in leg 95. This action locks the fitting in position. At the same time roller 78 enters a cam slot—for example, the mouth 106 of cam slot 107 of cam leg 94. This is the position of Fig. 1; the fitting has not yet been rotated to the full "on" position of Fig. 3. Then, continued rotation drives the roller 78 down to the final operative position 108 of the cam slot shown in Fig. 4, in which position the crank 77 has been moved to switch-closing position. This final operative position is typified by the Fig. 3 view in which the arrow marking at the end of handle 93 points to the word "on" formed in the flange portion of the collar 5.

If the fitting is removed and rotated through 180 degrees to bring the cam leg 95 into operative position, the mouth 110 of cam 111 will come into position with respect to roller 78, which then will be in the horizontal alignment with shaft 75 typical of switch open position. The fingers 102 and 104 of collar 5 will engage the respective locking slots 105 and 103 of the legs 95 and 94. Then, a twisting effort on handle 93 to rotate the disk 91 counterclockwise into the Fig. 3 position will cause the cam to drive the roller 78 up along the cam track until it comes to the home position shown in Fig. 5, in which position the switch 43 will have attained a circuit-closing position effecting the opposite direction of motor rotation.

*Summary of operation*

When the disposer is to be operated the housewife removes the inlet fitting from the collar 5 and drops the table scraps, vegetable peelings, and other refuse into the hopper 15. Then the fitting is returned to the collar with the plate 91 seated on the peripheral shoulder 92. No particular care need be taken in this initial placement of the inlet fitting; so long as the cam legs clear the fingers 102, 104 (which as indicated in Fig. 3, are of short angular length) the fitting will drop into place. Valve disk 100 falls into open position as typified by Fig. 1. Then, handle 93 is twisted to bring the fitting to the Fig. 3 position, representing a closed-circuit condition of switch 43.

It is important to note that it makes no difference whether cam leg 94 or 95 is in operative association with the switch actuator crank 77 because reduction of the waste material is accomplished with equal facility for either direction of motor operation. Opening the cold water faucet (not shown) will produce a water flow effective to close close-switch FS and complete the motor energizing circuit, as explained in the aforementioned Powers Patent 2,244,402. Water pours through the opening in the annular plate 91 and cascades over the valve disk 100 to enter the hopper 15 in a circular curtain-like formation which quite effectively dampens the transmission of sound from within the hopper.

The rapidly rotating flywheel enforces a movement of the waste materials toward the shredder ring and the impellers tumble and throw the contents of the hopper forceably against the shredder pads 33, which cut, shred, abrade, and otherwise reduce the mass to small-particle size. Water movement within the hopper introduces a churning effect which facilitates movement of the waste mass. During this operation, and particularly as the pieces of waste material become smaller in size, the sharp edge portions of the ports 35 contirbute to the reduction of the material. Eventually, the material will be reduced sufficiently to flow into the chamber 23 by passage through the ports 35 and between the rim of the flywheel and the base of the shredder ring. The sweep of the sharp edged forward portions of impellers 26 before the shredder pads 33 and ports 35 cuts and clips stringy materials and effectively breaks bone slivers and other hard particles. It may be mentioned that when the flywheel is faced with the annular plate 25a, it is preferable to form the edge of the plate with groups of notches 35a which aid in the reduction of the mass. In a solid flywheel—for example, of cast iron—the notches 35a may or may not be provided.

The rotating flywheel operates effectively as an impeller pump and the slurry of waste particles and water is forcibly discharged into the tail piece 4. The vane or baffle 24 and the drainage slope of the chamber 23 interrupt any tendency of the slurry to circulate within the chamber. This vane 24 contributes to the uniformity of operation for either direction of motor rotation.

It has been noted that occasionally a hard or unduly long piece of waste—a long corn cob for example—will jamb between the rotor and the hopper structure and stall the motor. To continue operation, the jam must be broken; and it has been found that in a large proportion of jamming situations operation may be restored by energizing the motor to run in the opposite direction. This is very simply accomplished by shutting off the water flow, removing the fitting 90 and rotating it one half turn to bring the opposite cam leg into operative position. Then, the fitting is locked in motor-circuit closing position as previously described and the motor becomes energized for opposite rotation. In persistent situations, it may be necessary to reverse the motor circuit more than once before the jam is broken.

A novel aspect of the motor control devices of this invention is that each time the inlet fitting 90 is removed to load the hopper and then is returned to disposal-operation position either the cam leg 94 or 95 may be in motor-control position, and the motor will start in the direction dictated by the effective cam leg. By the law of averages, it may be assumed that the motor will operate as frequently in one direction as in the other, and because the symmetry of the impellers, shredder pads, and other elements renders the comminution mechanism equally effective for either direction of rotation, the wear on the comminution device is equalized, with resulting increase in the operating life thereof.

While there has been described what is at present considered to be the preferred embodiment of the invention, it will be understood that various modifications may be made therein, and it is intended to cover in the appended claim all such modifications as will within the true spirit and scope of the invention.

I claim:

1. Waste disposal apparatus including a comminution chamber having an inlet for securement about the drainage opening of a sink or the like and an outlet for evacuation of waste, comminution means within said chamber, a reversible motor for driving said comminution means in one or the other direction, a power circuit for said motor, a reversing switch in said circuit, said switch having an actuator disposed within said chamber and movable from a normal open-circuit position to either of two closed-circuit positions providing forward and reverse motor rotation respectively, an inlet fitting for insertion into the inlet of said chamber, means for manually displacing said fitting within said inlet, and a plurality of means on said fitting and selectively individually engageable with said switch actuator upon movement of said fitting in a single predetermined direction to operate said switch actuator means to establish a motor circuit for forward or reverse direction according to which of said inlet fitting means is brought into engagement with said switch actuator.

2. Waste disposal apparatus including a comminution chamber having an inlet, comminutions means including a movable element within said chamber, a reversible motor for driving said element in forward or reverse direction, a power circuit for said motor, a reversing switch in said circuit, said switch having actuator means disposed adjacent said inlet and movable from a normal open-circuit position to either of two closed-circuit positions providing forward and reverse motor rotation respectively, an inlet fitting for insertion into the inlet of said chamber, a plurality of means on said fitting individually engageable with said switch actuator and each of said means adapted to operate said actuator to a different one of said closed circuit positions, and means for manually displacing a selected one of said switch-engaging means to operate said switch actuator from open-circuit to its closed-circuit positions.

3. Waste disposal apparatus including a comminution chamber having an inlet, comminution means including a movable element within said chamber, a reversible motor for driving said element in forward or reverse direction, a power circuit for said motor, a reversing switch in said circuit, said switch having shaft means rotatable from a normal open-circuit position to either of two closed-circuit positions providing forward and reverse motor rotation respectively, cam follower means disposed adjacent said inlet for rotating said shaft means to its closed-circuit positions, an inlet fitting for insertion into the inlet of said chamber for manual rotation therein, said fitting having camming means engageable with said cam follower means upon rotation of said fitting in a predetermined direction to operate the switch to its closed-circuit positions at the option of the operator, and means for locking said inlet fitting against removal when said fitting is in switch-actuating position.

4. Waste disposal apparatus including a comminution chamber having an inlet, comminution means including a movable element within said chamber, a reversible motor for driving said element in forward or reverse direction, a power circuit for said motor, a reversing switch in said circuit, said switch having an open-circuit position and two closed-circuit positions respectively establishing one or the other directions of motor operation, switch actuator means within said chamber, said actuator means being movable from a switch-open position to either of said closed-circuit switch positions, means for normally establishing said actuator in switch-open position, an inlet fitting for insertion into the inlet of said chamber for manual rotation therein, a first cam means on said fitting effective upon rotation thereof in a predetermined direction to engage with said switch actuator means to move the same from its open-circuit position to one of its closed-circuit establishing positions, and a second cam means on said fitting effective upon rotation of said fitting in a predetermined direction to move said switch actuator from its open-circuit position to the other of said closed-circuit establishing positions, either of said cam means being useful at the option of the operator.

5. Waste disposal apparatus as in claim 4, in which the respective cam means on said inlet fitting are disposed on diametrically opposite sides thereof.

6. Waste disposal apparatus as in claim 4, in which the respective cam means on said inlet fitting comprise rigid leg members extending therefrom on diametrically opposite sides thereof, said leg members each having a cam slot adapted to engage with said switch actuator to move the same to a closed-circuit switch position; the said cam slots respectively producing movement of said actuator in opposite directions.

7. Waste disposal apparatus including a comminution chamber having an inlet for securement about the drainage opening of a sink or the like, and means for draining said chamber into a plumbing drain line, comminution means within said chamber, a reversible motor for driving said comminution means in one or the other direction, a power circuit for said motor, a reversing switch in said circuit, said switch having actuator means disposed adjacent said inlet and movable from a normally open-circuit position to either of two closed-circuit positions providing forward and reverse motor rotation respectively, an inlet fitting for insertion into the inlet of said chamber, means disposed on diametrically opposite sides of said fitting and selectively individually engageable with said switch actuator upon manual rotation of said fitting in a predetermined direction within said inlet to operate the switch actuator to a circuit-closing position at the option of the operator, and valve means on said fitting adapting the same for use as a sink drain plug.

8. Waste disposal apparatus including a comminution chamber having an inlet for securement about the drainage opening of a sink or the like and means for connecting said chamber to a plumbing drain line, motor driven comminution means in said chamber, a motor power circuit, a switch in said circuit, an actuator in said chamber for operating said switch between open and closed-circuit positions, an inlet fitting for said chamber, said fitting having a relatively large annular plate member having a large diameter orifice formed with valve seat means about its periphery, means about the inlet of said chamber to support said annular plate in either of two basic positions, a valve disk for cooperation with said valve seat means, means for guiding said valve disk for gravity movement into or away from seating engagement with said valve seat means according to the basic position of said annular plate whereby drainage from said sink through said orifice may be permitted or blocked, means projecting from said annular plate engageable with said switch actuator for operation thereof upon rotation of said plate in a predetermined direction, said switch actuator means being effective only when said plate is in drainage-permitting position, and handle means for rotating said plate in said switch actuating direction.

9. In a waste disposal apparatus having a comminution chamber having an inlet for securement about the drainage opening of a sink or the like and means for connecting said chamber to a plumbing drain line, comminution means in said chamber, a reversible motor for driving said comminution means, a power circuit for said motor, a switch in said circuit operable from open-circuit position to either of two closed-circuit positions respectively establishing a forward and a reverse operation of said motor and crank means in said chamber for operating said switch between open position and either of its closed-circuit positions: a combined sink drain valve and switch actuator means comprising an annular plate supportable within said inlet for rotation therein, leg members extending from diametrically opposite sides of said plate in substantially mutual parallel relation, a crossbar extending between said leg members remote from said plate, a valve disk guided by means including said crossbar to operate between open and closed relationship with said annular plate to control fluid flow therethrough, cam means on each leg member engageable with said crank means to rotate the same to a switch-closing position when the plate is rotated in a predetermined direction, said leg members being selectively engageable with said crank means and each leg member operating said crank to a different one of its circuit-closing positions, handle means on the opposite side of said plate for rotating the same into switch actuating position, said valve disk being gravity operated to open position when the plate is placed for switch actuating position and movable to closed position when the plate is removed and inverted; neither leg member being capable of switch operation when in said inverted position and said crossbar then providing a handle for the manipulation of said fitting.

THOMAS H. SWISHER.

References Cited in the file of this patent
UNITED STATES PATENTS

| Number | Name | Date |
|---|---|---|
| 1,560,766 | Crites | Nov. 10, 1925 |
| 1,651,433 | Beach | Dec. 6, 1927 |
| 2,220,729 | Powers | Nov. 5, 1940 |
| 2,477,686 | Coss | Aug. 2, 1949 |